July 16, 1929. S. B. HOOD 1,721,218
MULTIPLE CONDUCTOR AERIAL CABLE
Filed Dec. 24, 1925
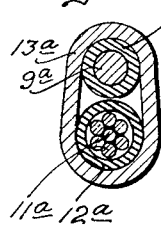
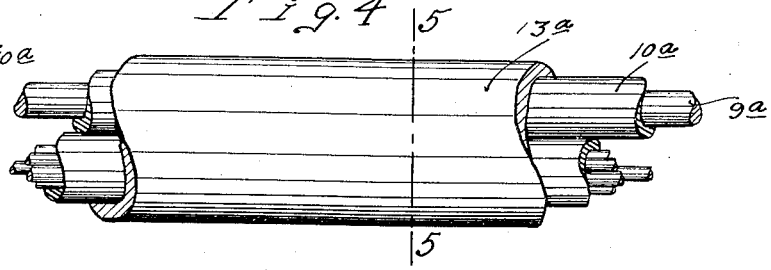
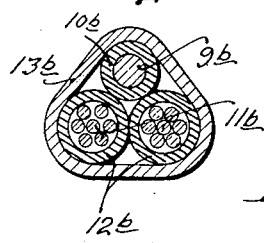
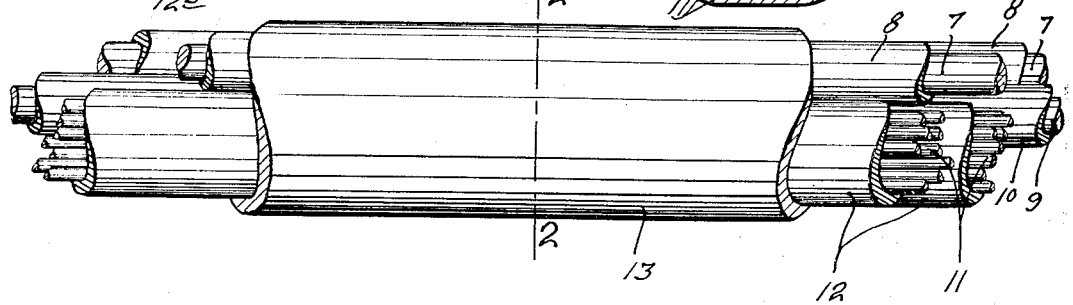
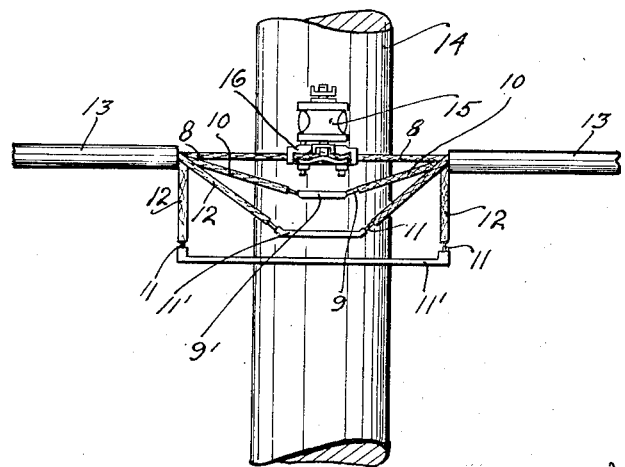
Inventor
Samuel B. Hood
By his Attorneys Patented July 16, 1929.

1,721,218

UNITED STATES PATENT OFFICE.

SAMUEL B. HOOD, OF MINNEAPOLIS, MINNESOTA.

MULTIPLE-CONDUCTOR AERIAL CABLE.

Application filed December 24, 1925. Serial No. 77,551.

This invention relates to multiple conductor aerial cables and provides an improved arrangement whereby for a given expenditure of money greater conducting capacity, greater strength and minimized loss of current is obtained.

In the distribution of electricity for light and power it has hitherto been customary in overhead distribution to support the necessary number of electrical wires or distributors, either bare or insulated, from suitable insulators mounted on cross arms or brackets attached to poles. These conductors are usually so spaced that when they swing in the wind they will not touch each other and thereby produce short circuits. Even if insulated the wires are liable to twist loosely around each other, in which case the insulation will soon be worn through and a short circuit created. In some kinds of distribution, such as the telephone distribution practice, a multiplicity of small conductors, all far too small to support themselves separately, are enclosed in a protecting sheath, commonly of lead, and such wires in the form of a cable are then supported by hooks from a high strength steel wire or cable generally designated as a messenger cable and which is arranged solely to carry mechanical stresses and performs no function as an electrical conductor. Such an arrangement of the messenger cable solely as a support is wasteful, and, moreover, does not give a minimum resistance to wind pressure which, as is well known, is one of the most disturbing factors in the maintenance of the service. The greater the number of separated conductors for a given conducting capacity the greater will be the lateral wind stresses and conversely, and in the latter arrangement such wind stresses have been very destructive during storms and have greatly interfered with the service.

In my improved multiple conductor aerial cable I dispense with the commonly employed messenger cable and all similar supports which act only in tension to carry the load and do not serve as conductors, and I incorporate within a common casing or multiple cable, conductors of quite different characters and which, for the purpose of distinction, I will hereinafter designate as a major or "live" messenger wire and a minor or lesser wire. Both classes of these wires are utilized as electrical conductors. There may be one or more major wires and one or more minor wires. The major wires are of such size and tensile strength that they will carry the load of the entire cable independently, if necessary, of the minor wires. Primarily, the major wires are selected for their mechanical qualities but their size will always be such that they will do high service in carrying current. The minor wires may be then selected for their conducting capacity and irrespective of their tensile strength, and from this it follows that these minor wires or conductors may be made up each of a plurality of small wires such as used in telephone service or the like.

The major and minor wires of course must be suitably insulated from each other so that short circuits cannot occur within the cable. The several major and minor wires are then encased within a common casing which may be of any suitable character but usually will be quite thick waterproof braided fabric casing which, while light in weight, will have sufficient strength to bind the several wires together and keep the same in such compact formation that the wind pressure will be reduced to a minimum.

Several forms of the improved cable are illustrated in the accompanying drawings wherein like characters indicate like parts throughout the several views.

Referring to the drawings:

Fig. 1 is a fragmentary side elevation showing one form of the improved multiple conductor cable;

Fig. 2 is a section on the line 2—2 of Fig. 1;

Fig. 3 is a fragmentary elevation illustrating the manner of supporting from a pole the cable shown in Figs. 1 and 2;

Fig. 4 is a view corresponding to Fig. 1 but illustrating a somewhat simpler form of cable from that shown in Figs. 1 and 2;

Fig. 5 is a section on the line 5—5 of Fig. 4; and

Fig. 6 is a view corresponding to Fig. 5 but illustrating a further slightly modified form of cable.

Referring first to the construction illustrated in Figs. 1, 2 and 3, the numeral 7 indicates two major wires or conductors shown as provided with insulations 8. The numeral 9 indicates one of the minor wires or conductors shown as provided with an insulation 10. The numeral 11 indicates two additional minor conductors, each made up of a plurality of small wires contained within insulating casings 12. Around the several wires or conductors just noted is placed a heavy outer casing 13 which, as before stated, will usually be heavy water-proof fabric casing.

In Fig. 3 the numeral 14 indicates a pole provided with an outstanding arm 15 and a wire-clamping device 16. The major wires 7 are extended continuously or unbroken past the pole and are gripped and held by the clamping device 16. The wires or conductors 9 and 11 are shown as broken or severed at the pole 14, their severed ends being electrically connected, respectively, by metallic couplings 9' and 11'. These couplings 9' and 11' permit lead wires to be taken off but where not required it need not be necessary to interpose the same in the wires 9 and 11 and the said wires 9 and 11 could then be continuous past the pole.

In the simpler arrangement shown in Figs. 4 and 5, a single insulated major wire or conductor $9^a$ and an insulated minor conductor $11^a$ are contained within an outer casing $13^a$.

The cable shown in Fig. 6 involves a single major conductor $9^b$ and two minor conductors $11^b$ contained within an outer casing $13^b$.

A cable made up in this manner will usually have a slightly lower total weight than its equivalent made up in the usual manner as separately insulated conductors. For this reason the cost of the cable is comparable to that of its equivalent separate conductors.

The cost of erecting the cable will be materially less than its equivalent in separate conductors since it costs little more to erect one large conductor than one relatively small one.

Owing to the close spacing of the conductors in such a cable the amount of metal required to fulfill the electrical requirements of the circuit is appreciably less than that which would be required were separate conductors used with usual spacing between each conductor. This saving may be applied by using smaller conductors, thus decreasing the cost of the cable, or by using same size conductors and thereby increasing the electrical capacity for a given weight of metal.

What I claim is:

A composite conducting cable comprising an outer casing, and in said casing a wire line support and a multiplicity of relatively light current conducting wires, said casing having a gap for the application of a supporting clamp to said wire support, said wire line support being continuous and unbroken through the gap in the casing, said conducting wires being broken and spliced with different length couplings to space the wire splices properly among themselves and away from the supporting clamp upon which the supporting wire is held.

In testimony whereof I affix my signature.

SAMUEL B. HOOD.